United States Patent [19]

Chartrain et al.

[11] Patent Number: 4,562,126

[45] Date of Patent: Dec. 31, 1985

[54] STORAGE BATTERY COVER

[76] Inventors: Armand N. Chartrain, 115 Poinsettia Gardens, Ventura, Calif. 93004; Lee A. Genne, 1220 Johnson Dr., No. 111, Ventura, Calif. 93003

[21] Appl. No.: 652,954

[22] Filed: Sep. 21, 1984

[51] Int. Cl.$^4$ .............................................. H01M 2/04
[52] U.S. Cl. ...................................... 429/72; 429/87; 429/175; 429/185; 429/163
[58] Field of Search ...................... 429/87, 88, 89, 82, 429/83, 175, 163, 72

[56] References Cited

U.S. PATENT DOCUMENTS

| | | | |
|---|---|---|---|
| 1,269,096 | 6/1918 | Land | 429/77 |
| 2,697,129 | 12/1954 | Shannon | 429/77 |
| 3,218,198 | 11/1965 | Havlick | 429/88 X |

*Primary Examiner*—Anthony Skapars
*Attorney, Agent, or Firm*—Kenneth J. Hovet

[57] ABSTRACT

A cover for an electric storage battery casing having a slide member that is longitudinally adjustable to permit alignment of fill openings formed in the member over electrolyte inlets. The inlets have individual sealing means that cooperate with the slide member underside to close each inlet during battery use.

10 Claims, 4 Drawing Figures

STORAGE BATTERY COVER

BACKGROUND OF THE INVENTION

1. Field of the Invention

The present invention relates to electric storage batteries and, more particularly, to improvements in battery casing covers.

2. Description of the Prior Art

In general, storage batteries have multiple cells with lead plates surrounded by electrolyte. Depending on battery use, frequency of recharging and climatic conditions, the electrolyte evaporates and must be replenished to maintain the desired battery output. This is usually accomplished by removing a vented fill plug from each cell and pouring the liquid electrolyte through inlets above each cell. This, of course, is cumbersome and time-consuming—particularly where electrolyte replenishment is required on a frequent basis.

With the advent of electric powered vehicles or the everyday use of electric golf carts and forklift trucks, nightly recharging and electrolyte addition is a necessity. In such cases, a large number of storage batteries are involved with an even larger number of fill plugs.

To minimize plug handling, sliding covers were designed to close the cell inlets. U.S. Pat. Nos. 1,269,096 and 2,697,129 describe a plate that may be slid over the fill opening or swung thereover about a pivot. The flat plate underside and flat area about the inlet mate to form a seal.

A disadvantage of the above is that heat and chemical corrosion tend to warp the slide thus rendering ineffective the seal. This allows spillage and excess evaporation to occur. Also, a separate slide assembly is required for each cell opening.

A sliding cover for multiple cell fill inlets is shown in U.S. Pat. No. 3,218,198. In this construction, the slide seals along the upper periphery of a trough and the cell openings are located in the bottom of the trough. Because each cell is in communication with each other via the trough, contamination or a problem with one will be transferred and/or impact on the others. Note that a common problem with battery maintenance is the use of improper electrolyte or allowing grease, dirt, cleaners or other contaiminants to enter a cell. With the above system, all cells will be harmed instead of just one as before.

SUMMARY OF THE INVENTION

The present invention provides a system for providing quick easy access to multiple battery cell fill inlets. It further provides a simultaneous seal over each individual inlet. Still further, the seal for each inlet is forgiving and maintains effectiveness under chemical and thermal expansion, contraction or distortion.

The invention utilizes a slide member that overlies a plurality of fill inlets. Each inlet includes a peripheral sealing area for engagement with a corresponding surface on the slide underside. Fill openings extend through the slide between engagement surfaces and are spaced-apart a distance equal to the spacing between inlets. As so constructed, the slide may be reciprocated longitudinally between guide means from an inlet closed position where each inlet is sealed to a vent, to an inlet open position, where the openings are aligned above each inlet.

DESCRIPTION OF THE PREFERRED EMBODIMENTS

Figure 1:
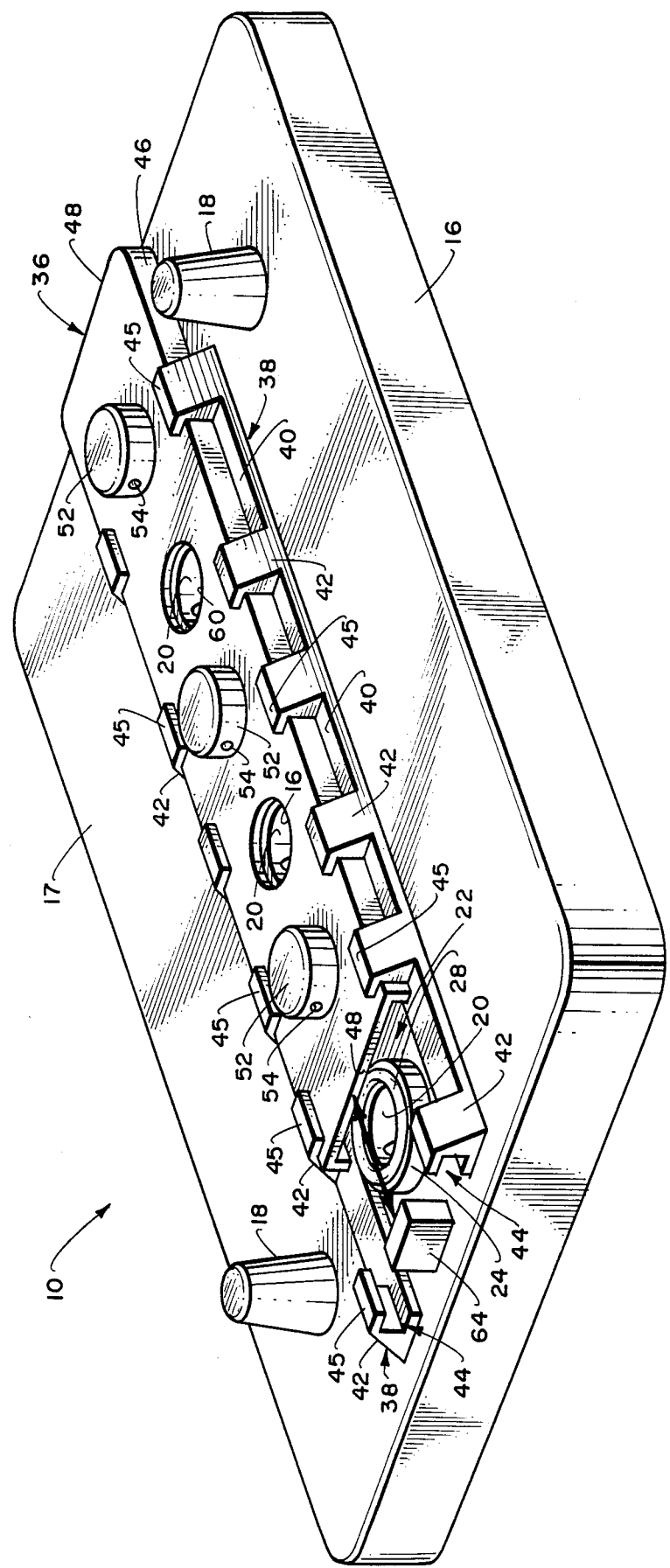
FIG. 1 is a perspective view of a battery casing cover of the invention showing the slide member in an open position.
Figure 2:
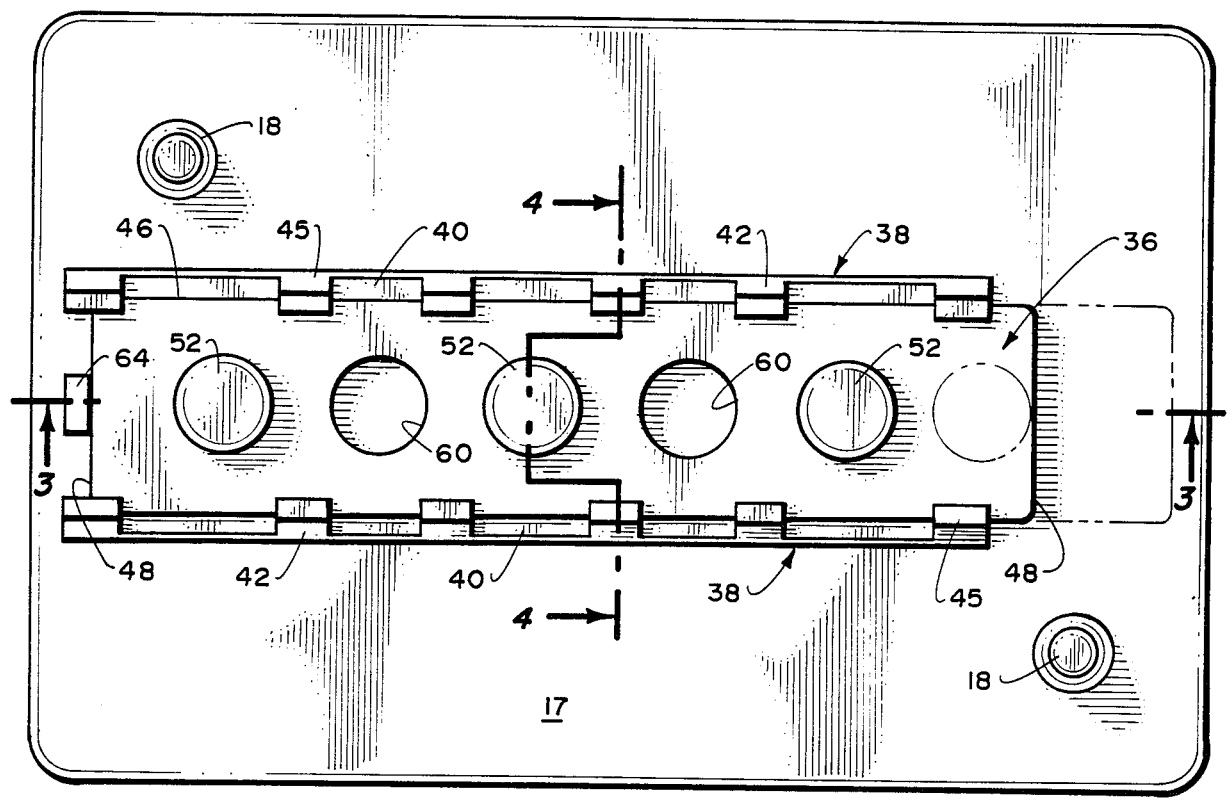
FIG. 2 is a top plan view of the cover shown in FIG. 1 with the slide member in a closed position.
Figure 3:
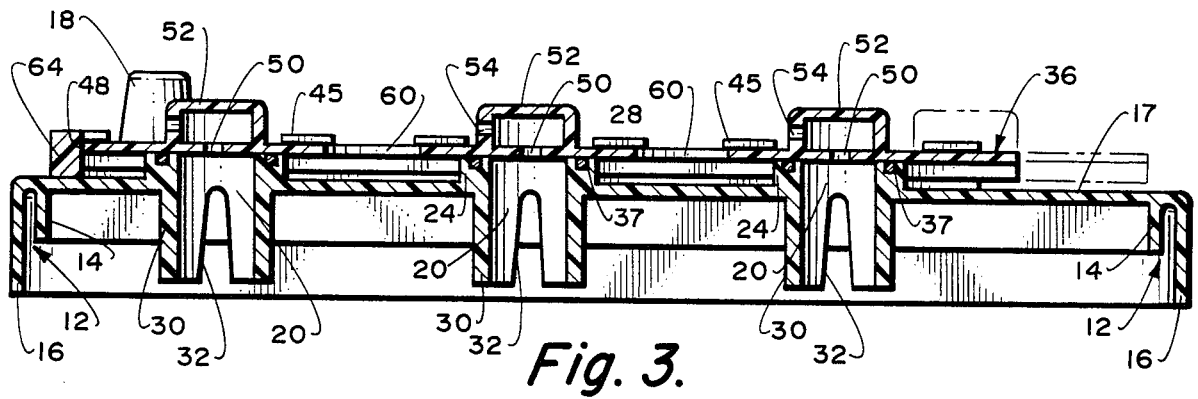
FIG. 3 is a cross-sectional view taken along lines 3—3 of FIG. 2.

With reference now to the drawings, FIG. 1 shows the overall battery casing cover (10) of the present invention. The cover is adapted to engage the upper edge portion of a battery casing (not shown) with U-shaped joint (12) defined by underside flange (14) spaced inwardly from cover peripheral wall (16). Battery posts (18) extend through the cover top wall (17) for subsequent connection with cable connectors in a manner well known in the art.

In the embodiment shown, the cover is provided with three battery cell fill inlets (20). The upper periphery of each inlet includes a sealing area (22). As shown, this area comprises an upstanding annular rim (24) having a sealing means on the upper surface thereof. The sealing means is a flexible or resilient material constructed as an O-ring, gasket, washer, or the like. In the preferred embodiment, the upper surface of the rim includes an annular groove (26) within which an O-ring is secured. A portion of the O-ring surface will extend above the upper surface of the rim to effect a seal in a manner to be hereinafter described.

Extending downwardly from the underside of the cover about each inlet (20) is a skirt (30) having one or more slots (32). As is well known in the art, a skirt provides visual means of when the battery cell is filled with electrolyte. The slots provide a predetermined air lock and electrolyte spacing from the underside of the cover for each cell. The above construction for the purpose of preventing cell overfilling.

Figure 4:
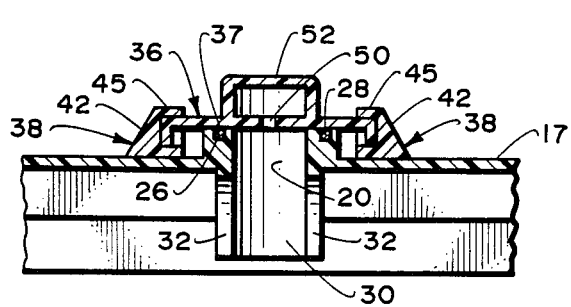
FIG. 4 is a fragmentary cross-sectional view taken along lines 3—3 of FIG. 2.

Overlying the fill inlets (20) is slide member (36). The slide member is a flat plate-like rectangular-shaped member having straight side edges (46). Guide means, shown as support strips (38), are located on opposite sides of the slide and engage the edges (46). As best shown in FIGS. 1 and 4, the edges (46) are turned down to accommodate the height of annular rim (24).

In the preferred embodiment, each support strip comprises an elongated foot portion (40) from which extends spaced-apart brackets (42). Overhang portions (45) of each bracket form an inwardly directed passage (44) with the foot portion (40). The passages correspond in shape to the opposing edge portions (46) of the slide member so that the member may properly reciprocate therebetween.

It will be appreciated that the heighth of each bracket passage (44) is sufficient to accommodate the downturned edge portions (46) of the slide. In this manner, clearance is maintained over each inlet rim. However, the foot portion (40) of each support strip could elevate the slide a sufficient distance to accommodate the height of each rim. In this regard, it will be noted that the underside of the slide member includes an annular engagement surface (37) for sealing contact with each of the sealing areas of the inlets.

In the preferred embodiment, each sealing area is defined by the upper surface of O-ring (28) which contacts each engagement surface (37). It is expected that the slide member underside engagement surfaces will depress the O-ring an amount sufficient to effect an appropriate seal. Of course, other resilient or flexible means such as flexible plastic envelope rings, resilient washers or gaskets of corrosion-resistant rubber-like materials would work for the present invention.

An advantage of the present invention resides in the above sealing arrangement being able to accommodate variations in the underside engagement surface of the slide member. This is especially important in the hot corrosive environment typically found with battery use whereby parts become warped, corroded and distorted. Further, the above-described arrangement allows for the engagement surface to be self-cleaning upon reciprocation of the slide member over the resilient sealing means. In some instances, it may be appropriate to present a slightly convex engagement surface to facilitate the seal and positioning of the slide member over each inlet.

As is known in the prior art, storage batteries during use evolve heat and gases which must be vented to the atmosphere in a safe effective manner. The present invention provides a vent orifice (50) extending through the slide member within each of the sealed areas above each inlet. Overlying the orifice is a vent dome (52) which itself has an off-set vent outlet (54). The outlet is located in the dome side wall away from direct alignment with the vent orifice. A dome baffle (not shown) may also be used. The above construction is to prevent direct escape of toxic electrolyte and to encourage condensation of electrolyte vapor for its return to the battery cell through the aforementioned vent orifice (50).

Extending through the slide member between each sealing area are fill openings (60). The fill openings are centered along the longitudinal axis of the slide member with a diameter preferably equal to or less than inlets (20) in the same manner as the engagement surfaces (37) and domes (52). They are spaced-apart longitudinally a distance equal to the distance the inlets are spaced apart. As so disposed, the slide member may be moved to an open position as shown in FIG. 1 with the fill openings disposed directly above the corresponding inlets.

The length of the slide member is such that an end (48) of the slide member will pass either of the outer fill inlets and thereby provide access thereto for filling without requiring additional length and a fill opening. This allows the slide member length to be less than the length of the cover. Also, it permits an overall cover design whereby even when the slide member is in an open position, the slide end will not extend beyond the cover peripheral wall (16). Such an arrangement is especially advantageous when two or more batteries are positioned edge to edge whereby adjacent batteries will not interfere with slide member movement.

To facilitate moving the slide member to its closed position, a stop member (64) is provided. This member is shown as an upstanding part integral with cover top wall (17). A removable pin or set screw mounted in an end bracket passage would also work.

While the slide member is shown as reciprocating along the median line of the battery cover, the inlets and slide member could be aligned diagonally across the battery cover. Further, the invention is advantageous for use with more than the three fill inlets shown with the battery herein. In fact, the advantages of the invention become more apparent with a larger number of battery cells and fill inlets.

While the invention has been described with respect to preferred embodiments, it will be apparent to those skilled in the art that various modifications and improvements may be made without departing from the scope and spirit of the invention. Accordingly, it is to be understood that the invention is not to be limited by the aforementioned specific embodiments, but only by the scope of the appended claims.

We claim:

1. A storage battery cover having at least three battery cell fill inlets for replenishment of electrolyte comprising:
   an annular rim about the periphery of each inlet having sealing means about the upper surface thereof;
   a slide member having a length less than the length of the battery cover but of sufficient length to overlie said inlets with at least portions of the underside thereof having an engagement surface in sealing contact with each sealing means, said slide member including at least two fill openings therethrough located to overlie at least two inlets when said member is moved from a sealed position a predetermined distance; and,
   guide means for maintaining the slide member in alignment over said inlets while allowing the movement thereof along the longitudinal axis of said member.

2. The battery cover of claim 1 wherein said sealing means is resilient and selected from the group consisting of O-ring, gasket and washer.

3. The battery cover of claim 2 wherein said rim includes an annular groove with said sealing means comprising an O-ring secured within said groove.

4. The battery cover of claim 1 wherein said guide means comprises edge support strips secured to said case on opposing sides of the slide member.

5. The battery cover of claim 1 wherein said edge support strips comprise brackets having foot portions.

6. The battery cover of claim 2 wherein said slide member includes vent orifices therethrough located within the area defined by each of said engagement surfaces.

7. The battery of claim 6 wherein said slide member includes vent domes extending from the upperside thereof overlying each of said vent orifices.

8. The battery cover of claim 7 having three fill inlets and wherein said slide member includes three vent domes and two fill openings.

9. The battery cover of claim 1 including a stop member positioned thereon to limit the longitudinal movement of said member.

10. The battery cover of claim 2 wherein said engagement surface is convex.

* * * * *